April 2, 1946.    C. D. PETERSON ET AL    2,397,883
AUTOMATIC TORQUE CONVERTER TRANSMISSION
Filed Aug. 7, 1943    8 Sheets-Sheet 7
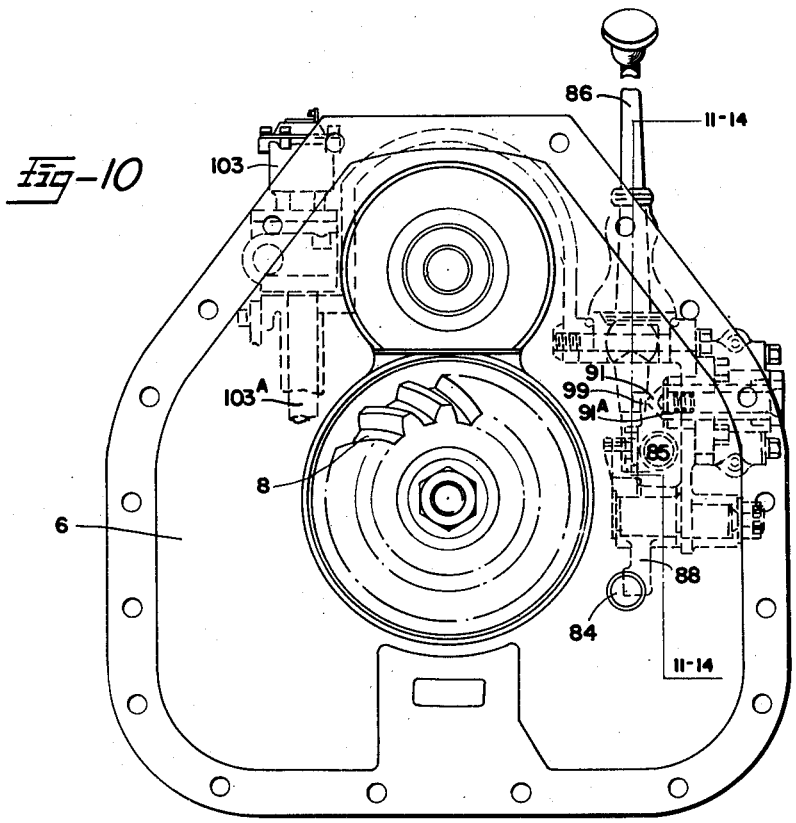
INVENTORS
CARL D. PETERSON
ALBERT H. DEIMEL
BY
Bodell & Thompson
ATTORNEYS

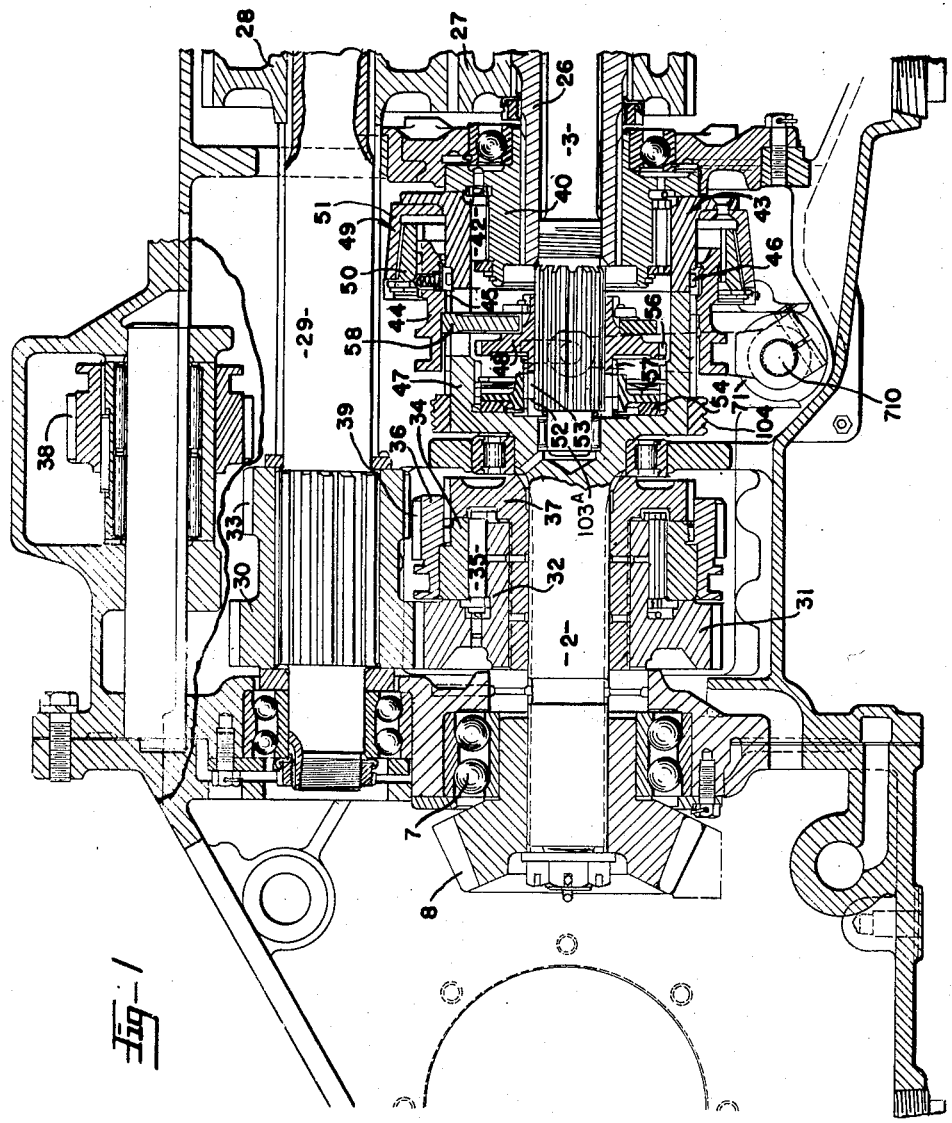

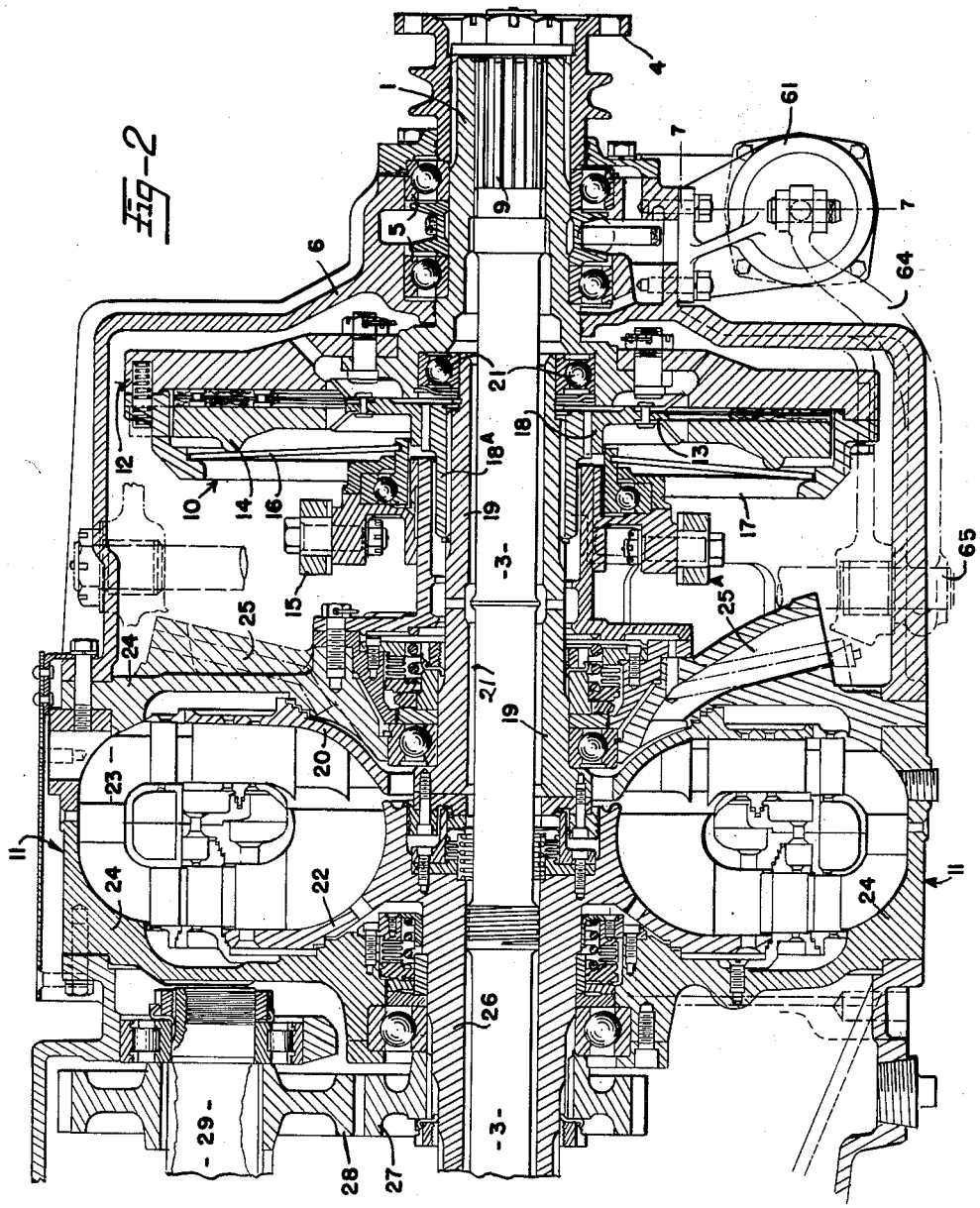

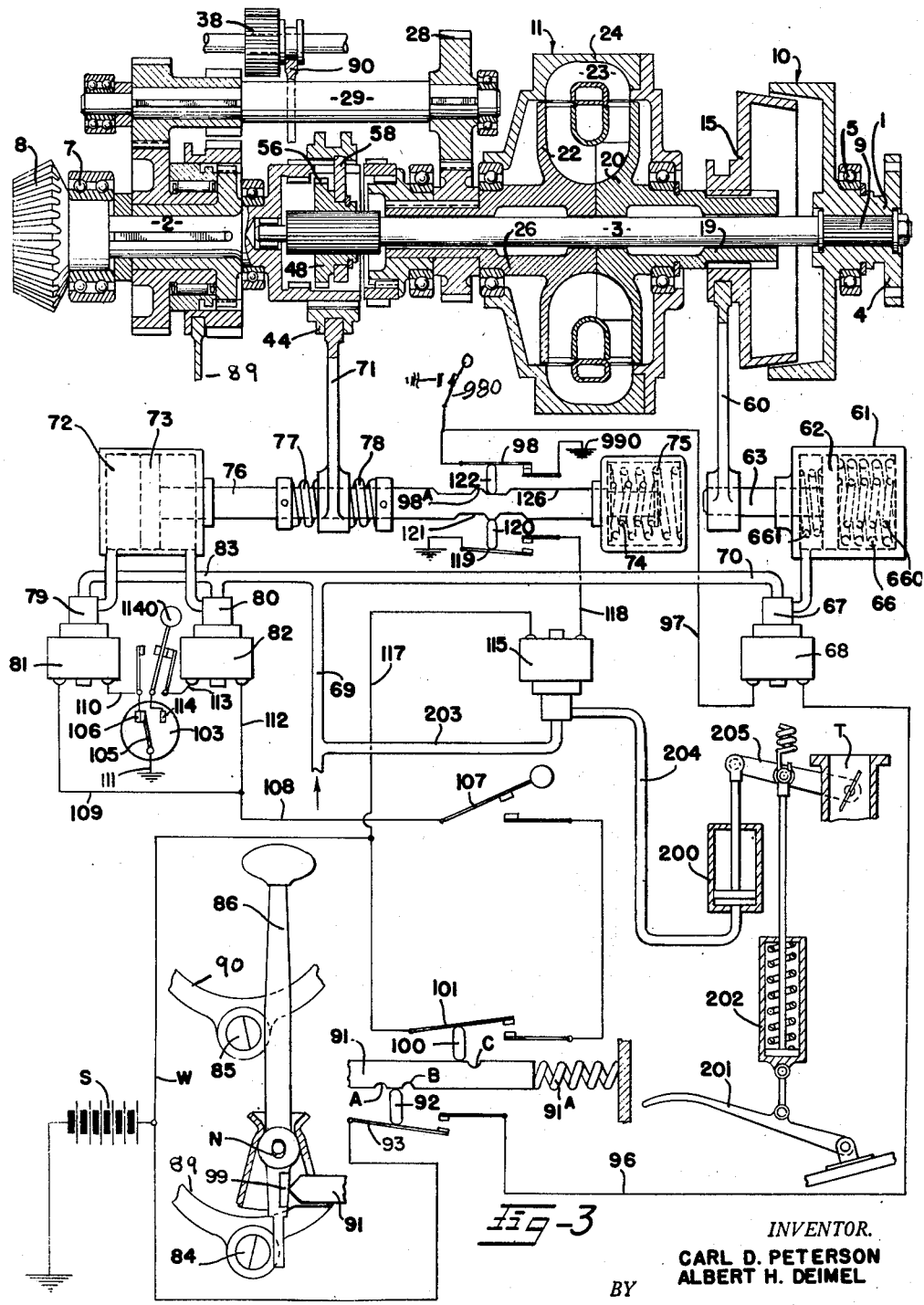

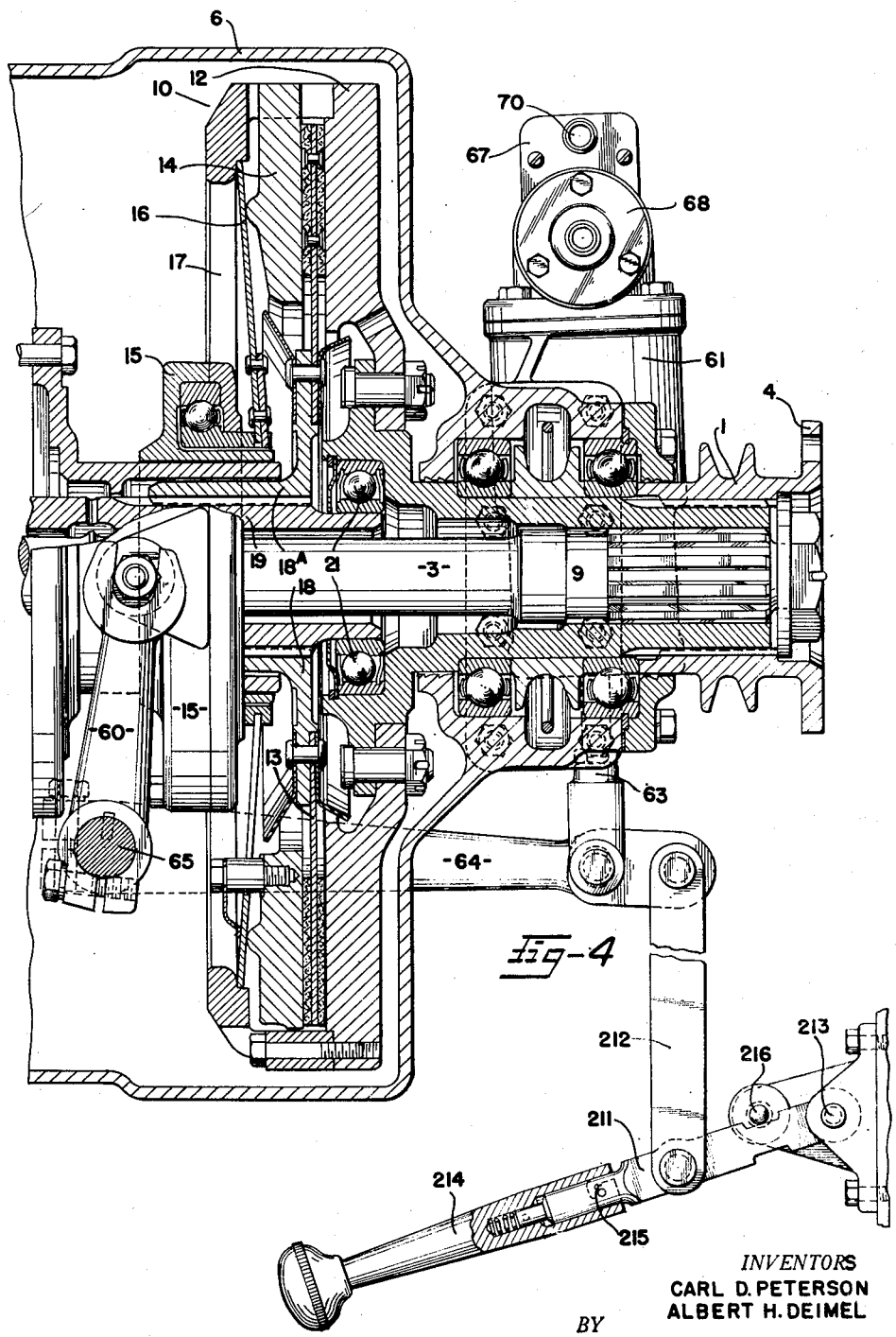

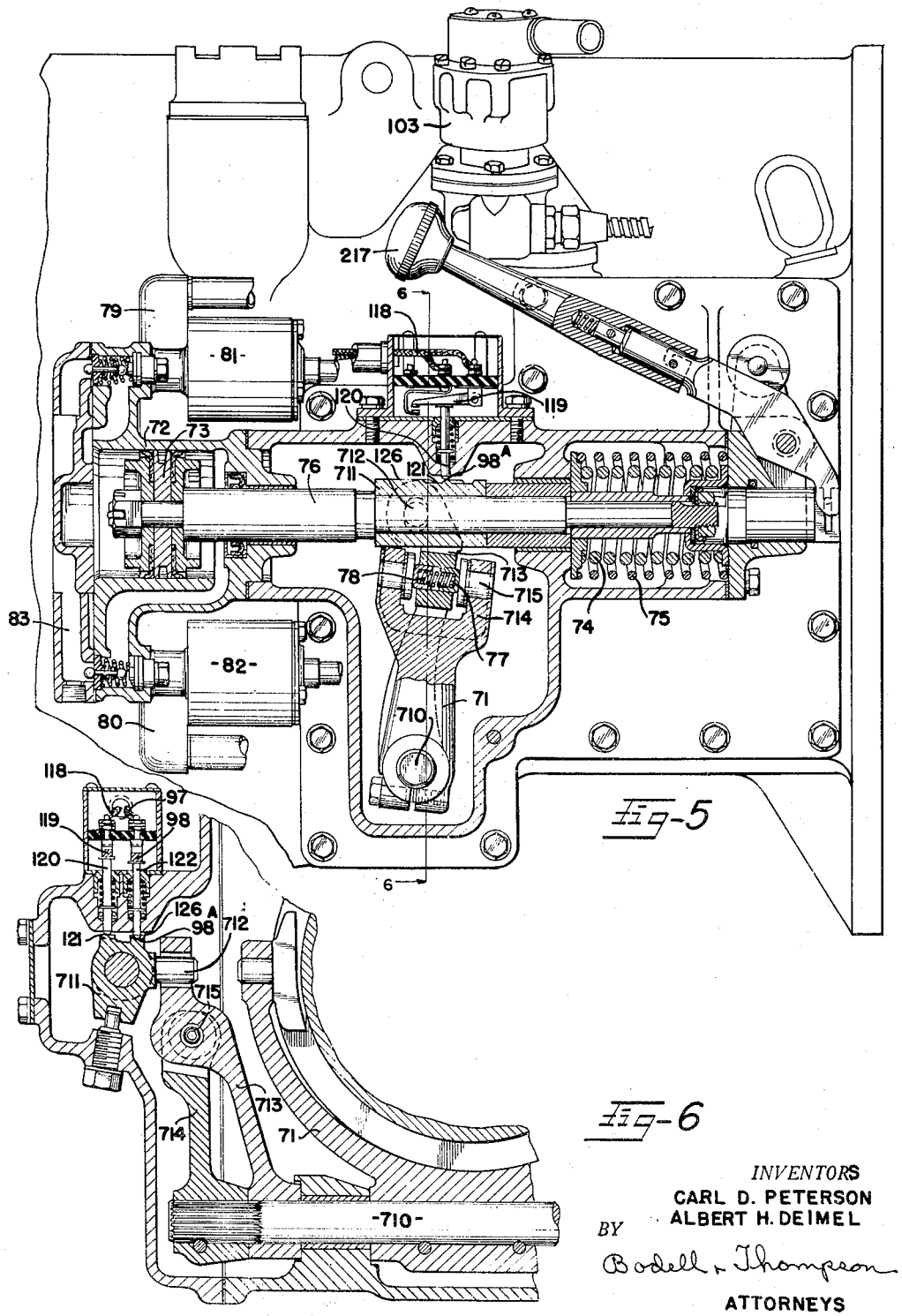

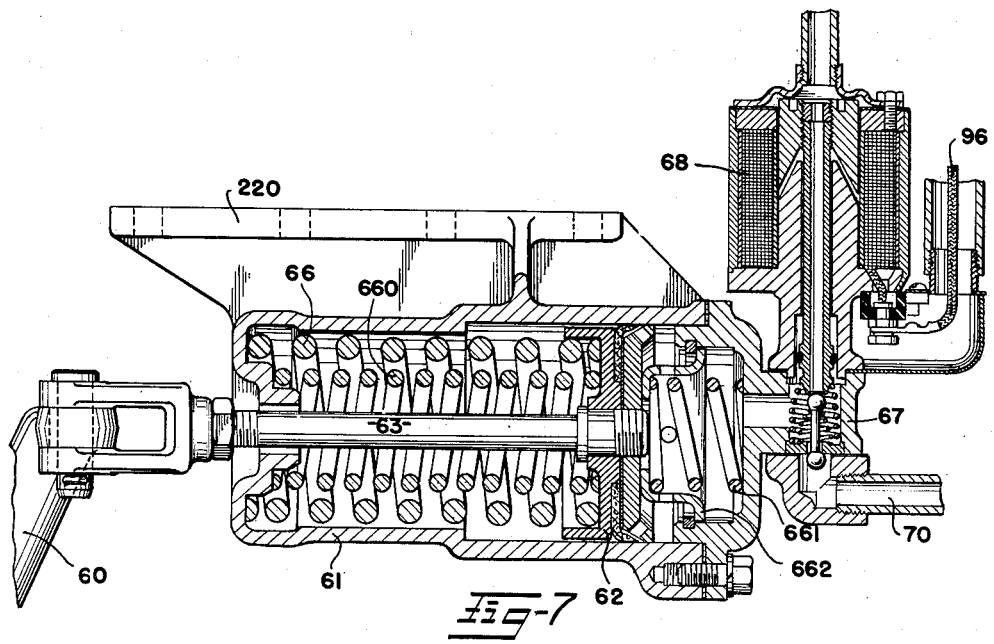
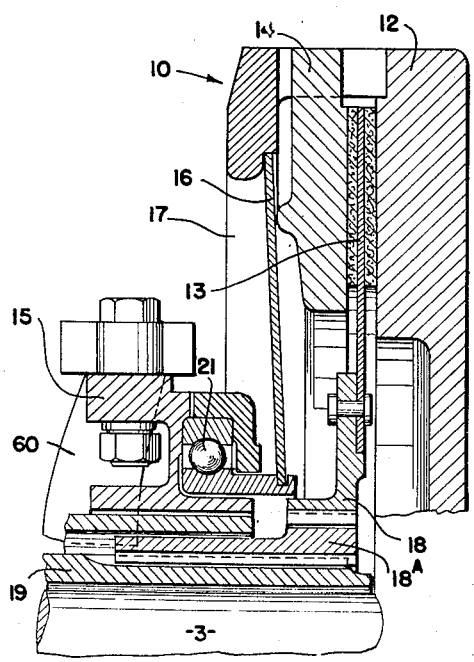
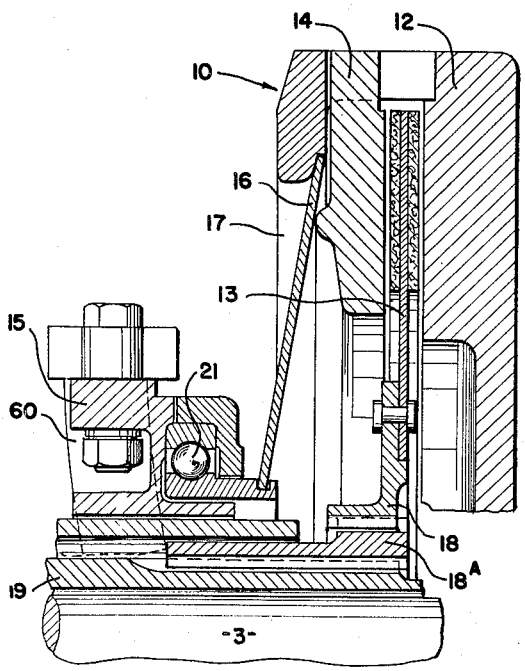

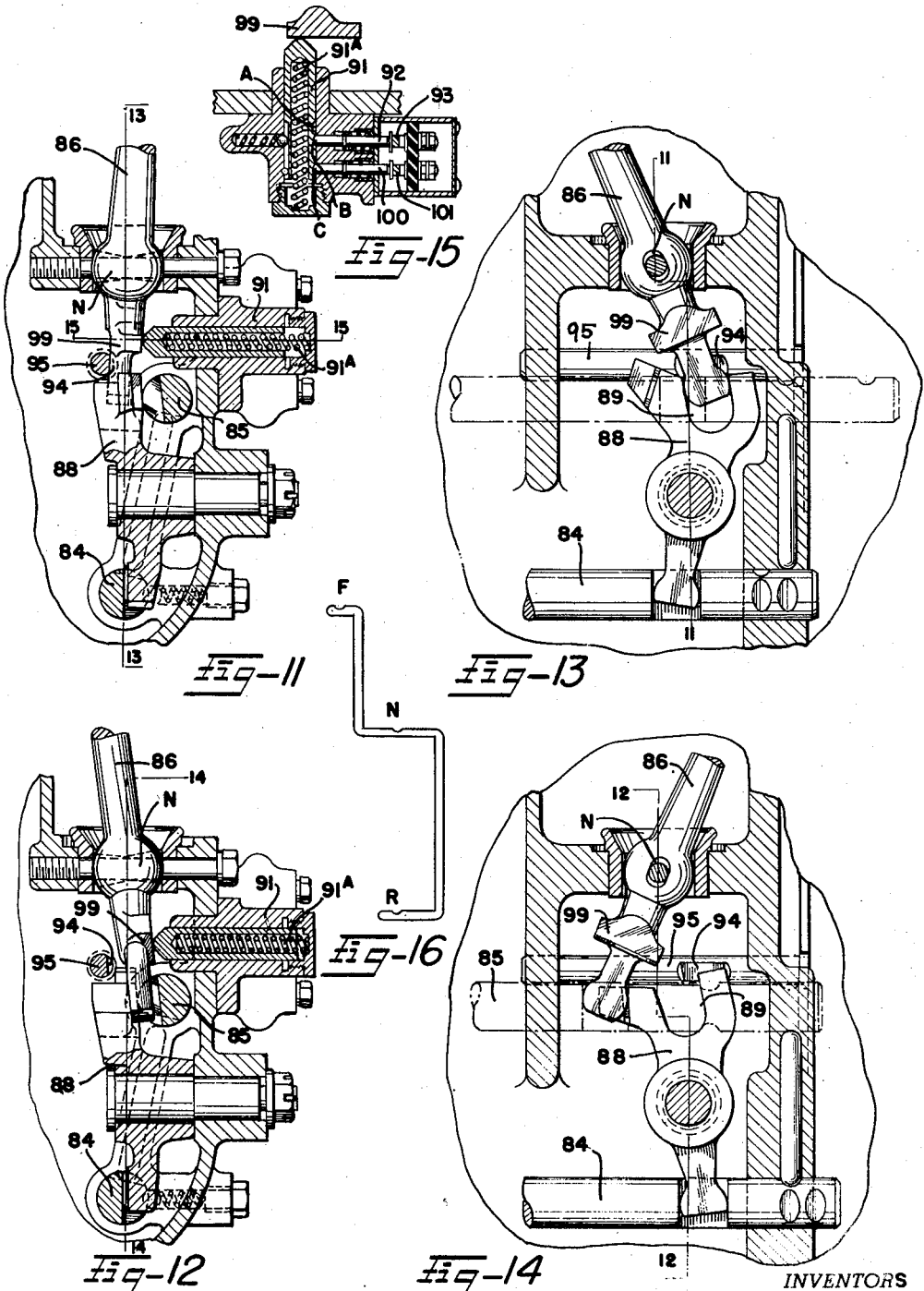

Patented Apr. 2, 1946

2,397,883

UNITED STATES PATENT OFFICE 2,397,883

AUTOMATIC TORQUE CONVERTER TRANSMISSION

Carl D. Peterson and Albert H. Deimel,
Toledo, Ohio

Application August 7, 1943, Serial No. 497,839

20 Claims. (Cl. 192—01)

This invention relates to power transmission mechanism for motor vehicles, particularly heavy vehicles of the tractor type, through which different gear ratios may be employed, and embodying a hydraulic torque converter for intermediate drives; and has for its object means by which the torque converter and other rotating parts including the main friction or engine clutch are dead or non-rotatable when in direct drive. It further has for its object a control by which the changes or shifts are quickly and automatically made from a low gear ratio to a higher gear ratio and from higher gear ratio into direct drive through synchronizing and balking ring clutches and the main clutch automatically declutched during the shifts.

The invention further has for its object a construction by which the torque converter with the main clutch automatically disengaged quickly brings about the synchronization of two parts to be clutched together.

Other objects appear throughout the specification.

The invention consists in the novel features and in the combinations and constructions hereinafter set forth and claimed.

In describing this invention, reference is had to the accompanying drawings in which like characters designate corresponding parts in all the views.

Figures 1 and 2 are longitudinal sectional views of front and rear portions of the gearing, Figure 2 being a continuation of Figure 1.

Figure 3 is a schematic view of the gearing and control therefor.

Figure 4 is a detail sectional view, partly in elevation, of the main or engine clutch and contiguous parts.

Figure 5 is a sectional detail view showing the mechanical structure of the power shifting mechanism for effecting converter and direct drives, contiguous parts being also shown.

Figure 6 is a fragmentary sectional view taken approximately on line 6—6, Figure 5.

Figure 7 is an enlarged lengthwise sectional view through the clutch operating cylinder and piston motor and contiguous parts taken approximately on line 7—7, Figure 2.

Figures 8 and 9 are fragmentary radial sectional views of the main or engine clutch showing the position of the parts of the throw-out mechanism, when the clutch is engaged, and when disengaged.

Figure 10 is an end elevation with the outer casing removed looking to the right in Figure 1.

Figures 11, 12, 13 and 14 are structural views of the hand shifting lever and the selecting and shifting mechanism operated thereby for effecting forward and reverse speeds; Figures 13 and 14 showing this mechanism in side elevation, and Figures 11 and 12 being sectional views thereof, Figures 11 and 12 being taken approximately on lines 11—11 and 12—12, Figures 13 and 14; and Figures 13 and 14 being taken approximately on lines 13—13 and 14—14, Figures 11 and 12, all views being taken on lines 11—14, Figure 10.

Figure 15 is a sectional view taken approximately on line 15—15, Figure 11.

Figure 16 is a diagrammatic view illustrating the movement of the hand shifting lever for effecting forward and reverse speeds.

This power transmitting mechanism includes, generally, a main or friction clutch, a hydraulic torque converter arranged to transmit the power of the motor or engine to the output shaft of the transmission through the torque converter in low forward and intermediate forward speeds, and reverse, the power being transmitting from the main or engine clutch through the converter, and power means for shifting the main clutch and for shifting clutches, as a synchronizing clutch and a balking ring clutch, through which indirect drives through the converter, and direct drive independently of the converter are, respectively, effected. It further includes clutches which are power operated and controls therefor including an output speed-operated control member for effecting the energization of the shifting means in accordance with the speed of the output shaft for disengaging the main or friction clutch preliminarily to gear shifting operations or the shifting-in of the synchronizing and balking ring clutches, and also for operating the throttle of the engine to decelerate the same during shifting operations, said control also operating to disengage the main clutch and hold it disengaged when the transmission is in direct drive so that the torque converter is idle or dead, when the transmission is in direct drive.

1, 2 and 3 designate, respectively, input, output and intermediate shafts, these being mounted in axial alinement. The input shaft is shown as tubular having a collar splined thereon and provided with a flange 4 for connection to a companion flange on the crank shaft of the engine of the vehicle. The shaft 1 is journalled in suitable bearings 5 in a supporting casing 6 enclosing the entire transmission mechanism. The output shaft 2 is also mounted in bearings 7 in the casing 6 and is shown as having a bevel gear 8 at its outer end for meshing with a ring gear, not shown, of the differential driving axle shaft section. These driving axles, as will be understood, have wheels or sprockets at their outer ends over which the tracks or tractor belts run and by which they are driven. The intermediate shaft 3 extends into the shaft 1 and is coupled thereto to rotate therewith, as by splines 9. It is in effect a part of the drive shaft.

The motion transmitting means between the input shaft 1 and the output shaft 2 through indirect drives will now be described. These indirect drives, in the present embodiment, are through a torque converter, one being a low gear ratio or what is called sub-converter, and the other an operating ratio usable between low or sub-converter and direct drive, the intermediate drive being referred to as "converter" drive. Both converter and sub-converter drives are through a main friction clutch corresponding to an engine clutch, that is, the motion of the shaft 1 is transmitted to the pump or impeller of the torque converter through a friction clutch. The friction clutch may be of any suitable construction.

10 designates the main clutch unit and 11 the torque converter unit, these being mounted concentric with the intermediate shaft 3. The clutch 10 includes a driving member 12 mounted on the input shaft 1 and being in effect a fly wheel thereon, a driven member or friction plate 13, a pressure ring 14, shiftable into and out of engaged position, and operable through suitable clutch mechanism, as a shifting collar 15 and clutch levers 16 operated thereby and fulcruming on the back plate 17 of the clutch and on the pressure ring. The friction plate 13 is capable of axial shifting and has a hub 18 slidably splined on a sleeve 18ª keyed to or splined on the tubular hub 19 of the pump or impeller 20 of the converter 11. There are suitable oil-tight bearings at 21 between the hub 19 and the driving member 12 of the clutch 10. The shifting of the throw-out collar 15 is normally effected automatically, as will be hereinafter described. 22 designates the turbine of the converter 11. The construction of the converter forms no part of this invention. It includes a pump or impeller 20, turbine 22, a re-actor 23, and an outer casing 24, which, in this embodiment of the invention, is shown as stationary and suitably secured to the main casing 6. The hydraulic fluid is injected into the converter 11 and withdrawn therefrom to be circulated through a suitable radiator or cooler, not shown, as through passages 25, 25ª. As the operation and construction of torque converters are well known, further description is thought to be unnecessary.

The turbine 22 has a rearwardly extending hub 26 around the intermediate shaft 3 on which a gear 27 of the low gear train is mounted, the gear 27 meshing with a gear 28 on a countershaft 29 having a gear 30 thereon, which meshes with a gear 31 mounted concentric with the output shaft 2, it being mounted on the hub of a clutch gear, to be presently referred to. The gear 31 has a hub 32, which is the inner raceway or cam of an overrunning clutch including an outer raceway 34 and rollers 35 between the outer race and the inner race or cam 32. The power is thus transferred through the overrunning clutch to a shiftable element or clutch collar 36 shiftable into exclusive clutching engagement with a clutch gear 37 having a hub keyed to or rotatable with the output shaft 2. The hub 32 of the gear 31 is mounted on the hub of this clutch gear. When the low or sub-converter drive is used, the clutch collar 36 is shifted into clutching engagement with the clutch gear 37. It is in this position in all forward speeds. Due to the overrunning clutch, when a shift is made into a higher gear, the output shaft 2 can overrun the low gear ratio. The reverse gear is also through the countershaft 29 and gears 30 and 31, when the clutch collar 36 is shifted out of clutching engagement with the outer race 34, and the reverse idler 38 shifted to engage the countershaft gear 33 and gear teeth 39 on the shifting collar 36.

For ordinary operations between low or sub-converter drive and direct drive, the motion is transferred as follows: from the input shaft 1 through main clutch 10, converter 11, and the hub or sleeve 26 of the turbine 22, as in sub-converter drive, thence to the overrunning clutch cam 40 of a second overrunning clutch through the rollers 42 to the outer race 43 of the second overrunning clutch, the overrunning clutch cam 40 being keyed to the hub or sleeve 26 of the turbine 22. The motion is then transferred through a shiftable clutch collar 44, which has been shifted, as will be hereinafter described, to bring its teeth 45 into clutching engagement with clutch teeth 46 on the outer race 43 of the second overrunning clutch, and thence through the clutch collar 44 to the output shaft 2, the clutch collar 44 being slidably keyed to or splined onto a hollow head or drum 47 fixed to or formed integral with the output shaft 2. The head or drum 47 is part of a clutch, as a balking ring clutch, to be presently described and operated in connection with direct drive, cutting out the converter 11 and the main clutch 10.

The direct drive is from the input shaft or sleeve 1, intermediate shaft 3 and the balking ring clutch, which includes a sliding toothed or jaw member 48, to the output shaft 2. The second overrunning clutch, which includes the rollers 42, permits the direct drive to overrun the converter drive. When in direct drive, the converter and parts actuated thereby are idle as the clutch 10 is disengaged.

In shifting up from low or sub-converter drive, which is through the countershaft 29, and the overrunning clutch, which includes the rollers 35, it is merely necessary to shift the clutch collar 44 to engage its teeth 45 with the clutch teeth 46 on the outer race 43 of the second overrunning clutch, which includes the rollers 42. To effect this shift smoothly or without clashing, a large friction clutch 49 is provided, this being of any suitable construction, and it is shifted through automatic mechanism, to be presently described. As soon as sufficient shifting movement of the clutch collar 44 is made to engage the friction clutch 49, the friction clutch 10 is automatically disengaged by a cam mechanism operated by a shifting member, which operates the clutch collar 44, this cam mechanism controlling an electric switch, which controls the operation of the clutch 10.

With the friction clutch 10 disengaged, the synchronizer 49 has to control only the parts between the clutch 10 and the shifting collar 44. The hydraulic converter itself then acts as a powerful brake for the reason that the clutch 10 is disengaged, and hence no power is being put into the converter 11. Therefore, the converter 11 will rapidly slow down and thereby aids the friction synchronizer 49 in synchronizing and making a very rapid shift. Also, to prevent racing of the engine with no load on it, the throttle is automatically closed by a cam control mechanism similar to that controlling the friction clutch, all as will be presently described.

As soon as the synchronization is brought about, the clutch collar 44 moves fully into engagement with the outer race 43, that is, the clutch teeth 45, 46 will interlock. Upon such interlocking, the main clutch 10 will be again automatically engaged and the throttle released, permitting the engine to speed up and take up the drive again through the converter overrunning clutch, which includes the rollers 42 and clutch collar 44 to the output shaft 2 through the head or drum 47.

The friction clutch 49 may be of any well known construction. As is well known, a synchronizing clutch includes friction sections, which engage in advance of jaw or toothed sections, the friction sections being capable of transmitting torque and of having a braking effect. It is further well known that in shifting-in, the friction sections are first engaged and the motion of the shiftable toothed section to which the shifting pressure is applied is connected to the friction section through yielding means, which causes the friction and toothed sections to first shift as a unit, until the friction sections engage, and then as the speeds synchronize and shifting-in pressure continues to be applied to the toothed section, the yielding means yields or is overcome and permits the toothed section to be shifted in relatively to the friction section. This operation of synchronizing clutches, it is believed, is well understood. The term "synchronizing clutch" thus describes a clutch having the foregoing features. With this explanation, upon the shifting of the clutch collar 44, the friction section 50 of the synchronizing clutch engages the outer section 51, so that motion is transmitted through the friction sections to the clutch collar 44 and head 47, first with a slipping movement, and finally with nearly full torque, when continued shifting-in pressure applied to the collar 44 brings the teeth 45 into interlocking engagement with the teeth 46, thus clutching the outer race 43 of the overrunning clutch to the head 47 through the friction section, and when the speeds synchronize, further shifting-in movement of the collar 44 against the yielding means, as yielding poppets, effects the clutching of the outer race 43 directly to the head 47 on the output shaft through the clutch teeth 45 and 46.

The balking ring clutch, which includes the toothed or jaw section 48, may be of any suitable or well known construction. Balking ring clutches are also well known. A conventional balking ring clutch, in addition to the toothed or jaw sections to be engaged, includes a balking or blocking ring, or annular locking bolt, having a slight or limited rocking movement. The ring is mounted on one of two parts to be clutched together and is frictionally engaged with a friction surface on the other of the two parts, the friction area and other factors being sufficient only to rock and control the shifting of the balking ring from a balking or locking position to an unlocked position, and vice-versa, and not being sufficient to transmit torque. The balking ring itself may be spring-pressed with sufficient pressure to initially hold the balking ring engaged, so that when the balking ring clutch is disengaged, the balking ring will be rocked to locked position. This friction is amplified in proportion to the shifting-in force, when the balking ring clutch is being engaged, and is sufficient to cause the balking ring to be rocked by its friction as the speeds of the two parts to be clutched together, cross. As the speeds cross, the balking ring rocks to unlocked position. The term "balking ring" clutch describes a clutch having the foregoing characteristics.

52 designates the balking ring, which has a slight rocking movement, it being splined with loosely fitting splines on a collar 53 splined on the intermediate shaft 3. 54 is the friction ring rotatable with the head 47 and coacting with the balking ring. The balking ring is spring-pressed, as by a flat spring or spring washer 57ᵃ to hold it frictionally engaged with the ring 54. The slidable jaw section 48 has peripheral teeth or jaws 56 for interlocking with complemental internal teeth within the head 47. It also has balking teeth 57 on the hub thereof for entering passages in the hub of the balking ring 52 when alined therewith and being out of alinement therewith when the speeds are different and becoming alined therewith, as the speeds cross, to permit complete shifting-in of the teeth 56. Any form of balking ring clutch may be used.

Shifting-in pressure is applied to the toothed or jaw section 48 from the collar 44 through radial arms as 58 on a disk rotatable with the jaw section 48, the arms extending through lengthwise slots in the head 47 and secured at their ends to the collar 44. The collar 44 is thus common to the synchronizing and the balking ring clutches.

The shifting and control mechanism will now be described with particular reference to the schematic view (Figure 3). The throw-out collar 15 of the clutch 10 is operated through a fork 60, which is actuated by power, as by a cylinder and piston motor connected to the fork 60. 61 designates the cylinder and 62 the piston therein having its rod 63 connected to the fork 60. In the schematic view, it is shown as connected to the fork directly. Actually, as indicated in Figures 1, 2 and 4, it is connected through a rock arm 64 mounted on a rock shaft 65 on which the fork is mounted. The piston 62 is single acting and is operated in one direction by a motive fluid, as compressed air, against the re-action of spring means 66, 66a. Normally under running conditions, the clutch is held engaged by the pressure of the air on the piston 62. The flow of air to the cylinder is controlled by a valve 67 of any suitable construction, this being of the combined intake and exhaust type and operated to open position by electro-magnetic means, as a solenoid 68 connected in an electric circuit. When the valve 67 is opened, air enters from a suitable source through a feed pipe 69, branch 70, and through the valve 67 to one end, as the left end (Figure 3) of the cylinder 61 or the right end (Figure 7), and actuates the piston to the right, and hence the fork 60 to the right, to engage the clutch 10. When the valve is operated, as when the electric control circuit is opened, the air will exhaust out through the combined intake and exhaust valve 67, permitting the springs 66, 66a to re-act and disengage the clutch 10.

The clutch collar 44 is operated by a cylinder and piston motor through a fork 71. 72 designates the cylinder, and 73 the piston therein normally arranged centrally of the cylinder and movable in opposite directions under air pressure against the action of returning springs 74, 75. In the schematic view, the motion is shown as transferred from the piston rod 76 to the fork 71 through yielding means, as springs 77 and 78, which permit sufficient relative movement of the piston 73 and the fork 71 to operate switches in the electric control system, preliminarily to shifting-in. Air is supplied to opposite ends of the cylinder 72 from the feed pipe 69 through valves 79, 80 of the combined intake and exhaust type, these being normally closed to the passage of air to the cylinder and operated to open position by solenoids 81, 82 connected in electric circuits controlled, as will be presently described.

When the valve 79 is opened by its solenoid, air will pass from the feed line 69 through pipe or manifold 83, through the valve 79 to the left end of the cylinder 72, moving the piston 73 to the right against the action of the spring 75, and this movement is also first transferred through the yielding spring 77, which permits sufficient lost motion of the piston rod 76 relatively to the fork 71 to first operate switches in the control system before shifting the clutch collar 44 to engage the synchronizing clutch and connect the output shaft in converter drive. When the valve 80 is opened and the valve 79 is closed to the intake of air, but open to the exhaust of air, the piston 73 is moved to the left from central position, shifting the collar 44 into direct drive relation through the balking ring clutch, the spring 78 permitting relative movement of the piston rod 76 and the fork 71 sufficient to operate switches, which cause the clutch 10 to be disengaged and the throttle to be closed before the shifting-in motion is transmitted to the fork 71.

In the schematic view (Figure 3), the fork 71 is shown as extending directly from the piston rod into the throw-out collar of the clutch 10 but structurally as seen in Figures 1, 4, 5 and 6, the fork 71 is mounted on the rock shaft 110 mounted in the casing, and the motion is transmitted from the piston rod 76 to the rock shaft 110 through the block 111 mounted on the piston rod to shift therewith and having a pin-and-slot connection at 112 with a rock arm 113 mounted to rock about the shaft 110, the rock arm 113 coacting through yielding connections including the springs 77 and 78 with the rock arm 114 splined or keyed on the shaft 110. The rock arm 114 is shown as bifurcated (Figure 5) with the bifurcations embracing a portion of the rock arm 113, and the springs 77 and 78 are mounted in said embraced portion of the rock arm 113 and thrust through suitable plungers or thimbles against the bifurcations respectively or against suitable heads or inserts 115 in said bifurcations. The block 111 is formed with cams for operating switches, as will be hereinafter described.

Sub-converter or low, and reverse drives are controlled through a hand shift operated forward and reverse shift rods 84, 85. 86 designates a selecting and shifting lever having the usual lateral selecting movement in neutral and fore-and-aft shifting movement into and from neutral. As the lever 86 is pivoted between its ends to have a lateral pivotal selecting movement and a fore-and-aft pivotal shifting movement, the lower or finger engaging end of the lever is the reverse of the hand engaging end. The movement of the hand engaging end is shown in Figure 15. In addition to the lateral selecting movement in the cross-over slot N, when in neutral, the lever 86 also has a lateral movement at the ends of its forward and rearward shifting movements. The lateral selecting movement of the lever 86, when in neutral, operates a switch to control the throwing out of the main clutch 10 during shifting operations and the lateral movement at the end of the shifting movement operates the switch to control the re-engaging of the main clutch, after the shift is completed.

It should be explained in regard to the terms right and left, that these movements are with respect to the driver who is facing to the left in Figure 1, that the drive pinion 8 is at the front of the vehicle and that the gear shift lever 86 is at the left of the driver, and further that in Figure 9, right to the driver is to the left in this figure, or to the left of one standing in front of the vehicle, as Figure 9 is a front elevation.

The movement of the lever 86 is as follows:

When in neutral, movement of the handle end of the lever to the left in the cross-over slot N causes the lower end to move to the right, selects the forward shift rod 84 or enters a notch in one end of an intermediate lever 88 pivoted between its ends, the other end of which works in a notch or recess in the forward shift rod 84 (Figures 10, 11, 12 and 13). This lateral movement permits the cam 91 to be shifted by its spring 91ª, into position to actuate a plunger 92 to open a switch 93 which controls the flow of current to the solenoid 68 operating the valve 67 to control the flow of air to and from the main clutch cylinder 61. The solenoid 68 being thus deenergized opens the valve 67 to the exhaust of air from the cylinder 61, and hence the clutch 10 disengages. Then forward movement of the handle end of the lever 86, and hence rearward movement of the lower end thereof, shifts the forward shift rod 84 to the left (Figure 13) through the motion reversing lever 88, and through the fork 89 shifts the collar 36 to the position shown in Figure 1, that is, in low speed forward position through the overrunning clutch, which includes the rollers 35. Then upon shifting of the handling end of the lever 86, further to the left in slot F, and hence the lower end further to the right, the cam 91 again closes the switch 93 or permits it to close. This additional further shifting is permitted by a notch 94 in a guide rod 95 (Figures 11 to 14), wherein the hand lever 86 and the forward speed rod is in forward shifted position. The cam 91 is biased in one direction, as by a spring 91ª, to hold the switch 93, which controls the clutch 10 closed when the lever is in neutral position. The cam is shifted by the selecting movement of the lever 86 to open the switch 93 and hence disengage the clutch 10 during shifting movement.

To shift out of forward speed into neutral, the reverse of these operations of the lever 86 take place and the clutch is disengaged while the shifting is taking place.

The cam 91 operates the switch 93 to open said switch and hold it open during the selecting movement and the shifting movements into forward or reverse, through means illustrated, as a plunger 92 normally arranged on a lift between two notches A, B on the cam 91, when the lever 86 is in neutral position. Upon selecting movement of the lever 86 and shifting of the cam 91, the plunger enters one or the other of the notches A, B and permits the switch 93 to close. When the shift is completed, and the handle end of the lever 86 moved laterally to the left, the cam 91 is shifted so that the plunger 92 is again on the lift between the notches and the switch 93 opened.

The selecting movement of the cam 91 also operates a plunger 100 to open the normally-closed switch 101 in the circuit to the solenoids 81, 82 which control the converter and direct drives.

This plunger 100 coacts with a single cam notch C in the cam 91 and is normally seated therein with the switch 101 closed. When, however, the selecting movement is made in either direction, the plunger 100 is cammed out of its notch and the switch 101 opened. When the shift is made into low speed forward through the lever 86 and the shift is completed, the switch 101 again closes as the plunger 100 re-enters the notch C in the cam 91. When the shift is made to select the reverse rod 85, the cam 91 is shifted farther by the spring 91a and carries the notch C out of alinement with the plunger 100, so that when in reverse drive, the switch 101 is open and there is no chance for the solenoids 81, 82 to be energized in the event the hand switch 107 is closed. The spring 91a presses the cam 91 against the lower arm of the lever 86, at 99, in all positions of the lever 86.

The switch 93 controls a circuit for the solenoid 68 as follows: from source S, wire W, switch 93, wire 96 to windings of the solenoid 68, wire 97, normally-closed switch 98 and return or ground wire 990.

To shift into reverse, the handle end of the lever 86 is operated to the right in slot N (left Figure 10) when in neutral, so that its lower end moves to the left (right Figure 10) and selects the reverse rod 85. This movement again operates the cam 91 to open the switch 93 to permit the clutch 10 to disengage during the shifting. Rearward movement of the handle end of the lever 86 moves the lower end forward (Figure 14) to shift the reverse rod 85, and hence the reverse idler 38 to the left (Figure 3) through the work 90. Now upon shifting of the handle end of the lever 86 to the left in slot R and the lower end to the right, the cam 91 is shifted to its normal position to effect the closing of the switch 93. The reverse of these movements brings the lever 86 back into neutral with the main clutch 10 disengaging during the shifting and re-engaging when the lever 86 is in neutral position. The cam 91 may be mounted, as shown in Figures 10, 11, 12 and 15, is spring-pressed against the lower arm of the lever 86 and is always biased in one direction toward switch-closing position, when the lever 86 is in neutral.

The switches and solenoids, valves, etc., are all shown diagrammatically in Figure 3, but they may be of any suitable construction.

The solenoid 82 which controls direct drive is controlled by a governor-operated switch 103. This is an output speed operated switch. This switch is driven from the output shaft in any conventional manner, and the switch itself may be of any suitable construction. It is driven from a spiral gear 104 on the output shaft 2 or on the head 47 through shaft 103a. As the drive for centrifugally operated switches is well known, and as the only feature of this switch, in so far as this invention is concerned, is that it is an output speed operated switch, further description is thought to be unnecessary. The switch 103 has a switch arm 105 (Figure 3) normally closing a circuit to the converter drive solenoid 81 through a contact 106. The circuits are as follows: from source S, wire W, switch 101, hand switch 107, when closed, wire 108, branch wire 109 to the solenoid 81, return wire 110 from the solenoid 81 to the contact 106 through switch arm 105 and through return or ground wire 111. Also, when the arm 105 is engaged with contact 114 from wire 108 through branch 112, the solenoid 82 and from this solenoid through wire 113 to contact 114 of the speed-operated switch 103, thence through switch arm 105 and return wire 111. The circuit through the contact 114 is through a manually operable closed switch 1140 operable to cut out the direct drive through the governor switch 103, when desired for braking the vehicle.

A braking system may be provided for descending long grades with the system in direct drive and engaged, and at the same time, the converter clutch, that is, the engine clutch 10 remains engaged, it being understood that ordinarily this clutch 10 is disengaged when in direct drive. Thus, during the braking operation, the vehicle drives the engine through direct drive thus providing a part of the braking effect. It also drives the impeller 20 of the converter through its input sleeve or hub 19, the impeller offering resistance which increases as the square of the speeds. The runner 22 and its output sleeve or hub 26 merely free wheels, and even when transmitting no load, the output of the converter can not reach the same speed as the input. By means of this system, whereby only part of the braking effect required is furnished by the converter, excessive heat is not produced beyond the capacity of the cooling system, which might be the case if the only braking effect were provided by the converter. To put the unit into braking position, only a switch is required operable to open the circuit through the low speed solenoid 81 or operable to disconnect the low speed side or contact 106 of the governor switch 103 from the converter solenoid 81 and connect it to the direct drive solenoid 82, thus regardless of the speed of the vehicle, the direct solenoid is energized. 1140 designates a manually operable switch normally in the position shown in Figure 3, this switch being operable to cut out the solenoid 81 which controls the drive through the converter, when the governor switch 103 is in the speed range of the converter drive, that is, when the switch arm 103 is engaged with the contact 106. Upon throwing of the switch manually, the circuit through the solenoid 81 is opened, so that the piston 73 of the shift cylinder 72 is returned to central position, shifting the clutch collar 44 to central position and also the circuit through the solenoid 82 closed, even though the governor switch is in the converter range. Thus, the piston 73 is energized to the left (Figure 3), to shift the collar 44 into direct drive through the balking ring clutch. Normally the main clutch 10 is unclutched when in direct drive through the balking ring clutch, but in this braking operation, the clutch 10 is re-engaged, so that the impeller of the converter is actuated during the braking operation. Therefore 980 designates a switch in parallel with switch 98, so that the circuit from solenoid 68 for the clutch cylinder 61 is not broken when shift is completed into direct drive even though plunger 122 rises on ramp 126 thereby opening switch 98, so that during braking operation impeller 20 of the converter 11 is actuated. Thus with switches 1140 and 980 closed, the braking system is applied since the direct drive is engaged and at the same time the converter clutch is engaged. Upon return of the switch 1140 to normal position, this braking system is cut out and the control system is restored to normal operation.

Assume that the lever 86 is in forward speed position and the vehicle in motion, the operator closes the switch 107, and as the switch 101 is in closed position, except when the rod 84 and when the reverse rod 85 is selected, is being shifted and the reverse rod in shifted position, the solenoid 81 will be energized, as the governor switch arm 105 is in engagement with the contact 106, thus opening the valve 79 to the flow of air to the left end of the cylinder 72, moving the piston 73 to operate the fork 71 to shift the collar 44 to the right, first engaging the synchronizer of the clutch 49, and when synchronization is effected, clutching the teeth 45 of the collar 44 with the teeth 46 of the outer race of the overrunning clutch including the rollers 42. Now, as the speed increases up to a predetermined speed, the arm 105 of the speed operated switch 103 is shifted to engage the contact 114, thus completing the circuit through the solenoid 82 and breaking the circuit through the solenoid 81, thus opening the valve 80 to the flow of air to the right end of the cylinder 72, and the exhaust of air from the left end. During this interval, the spring 75 re-acts and returns the piston 73 to central position, and hence returns the clutch collar 44 to neutral position. When the valve 80 is opened, it shifts the collar 44 to the left, and hence shifts in the balking ring clutch to connect the intermediate shaft 3 and the output shaft 2 in direct drive relation.

During shifting of the clutch collar 44 in either direction from neutral, and while the yielding lost mostion is being taken up between the piston rod 76 and the hub of the fork 71 through the spring 77 or 78, the throttle T of the engine of the vehicle is automatically closed or partially closed by a solenoid 115, which operates a valve 116 controlling the flow of power, as air, to and from a cylinder and piston motor 200 for operating the throttle valve T. This throttle valve is also operable by the regular driver-operated accelerator pedal 201. The foot throttle lever 201 is connected to the throttle valve through a spring link device 202 which permits the throttle T to be closed automatically, even if the accelerator pedal 201 is held depressed. The solenoid 115 is connected in a circuit including the wire W, wire 117, solenoid 115 and wire 118 and a switch 119, and this switch is closed during relative movement of the piston rod 76 and the fork 71 or during the yielding of the spring 77 or 78, by means of a plunger 120 operated by a cam between notches 121 on the piston rod 76 in the schematic view (Figure 4). It is opened by the lift between the ends, and at the ends of the depressions. The plunger 120 is arranged in the middle notch lift and the switch 119 open when the collar 44 is in neutral position, and immediately upon movement of the piston 73 and its rod 76 in one direction or the other from central position, the plunger 120 enters a depression 121, thus opening the switch 119 and energizing the solenoid 115 to open the valve 116 to the flow of air from feed pipe 69, pipe 203, valve 116, pipe 204 to cylinder and piston motor 20, which, through linkage 205, closes the throttle T, before the fork 71 and collar 44 start to shift. When the yielding lost motion between the piston rod 76 and hub of the fork 71 is taken up and the clutch collar 44 shifted to completely "in" position, the piston rod 76 has traveled far enough to cause the lift at the outer end of one or the other of the notches 121 to actuate the plunger 120 to again open the switch 119 and open the throttle or permit it to open. At this time, shifting of the collar 44 through the synchronizing clutch or the balking ring clutch has been completed. The cams or cam notches 121, 122 shown diagrammatically in Figure 3 are structurally provided on the cam block 711 (Figures 5 and 6).

In shifting the collar 44 to the right into converter drive through the synchronizing clutch 49, the engine clutch 10 is automatically disengaged by operating the valve 67 to permit the air to exhaust from the clutch operating cylinder 61 and the piston 62 to return to the left end of the cylinder 61 under the re-action of the springs 66, 66a. This release of the clutch 10 is effected by opening the normally-closed switch 98, which is opened by a plunger 122 operated by a cam notch, which is here illustrated diagrammatically (Figure 3) as provided on the piston rod 76 and structurally as in Figures 5 and 6. The cam consists of a wide notch having a lift 98a between its ends. With the clutch disengaged, the synchronizing clutch has to control only the parts between the clutch 10 and the shifting collar 44. The converter will therefore rapidly slow down and facilitate the crossing of the speeds of the clutch collar 44 and the outer race 43 of the overrunning clutch including the rollers 42, in making a very rapid shift, as at this time the clutch 10 being disengaged, no power is being put into the converter. During this operation, the engine is prevented from running away with no load on it, as the solenoid 115, which controls the throttle has been momentarily de-energized to close the throttle by the opening of the switch 119, while the piston rod 76 is moving to the right and lifts the plunger 120 out of the notch 121. When the shift is completed, the left hand notch 121 alines with the plunger 120 permitting the switch 119 to close. Thus, as soon as the synchronizing is completed, as described, and the collar 44 has shifted to the left to engage its clutch teeth 45 with the clutch teeth 46, the throttle is released, permitting the engine to speed up and take up the drive through the converter. When a predetermined speed is reached, say about half the maximum speed, the speed-operated governor switch 103 acts to shift its arm 105 out of engagement with the contact 106 into engagement with the contact 114, thus breaking the circuit to the solenoid 81, which controls the converter drive and opens the valve 79 to the exhaust of air from the left end of the cylinder 72 and close the circuit to the solenoid 82 to open the valve 80 to the flow of air into the right end of the cylinder 72, the switch 107 and also the switch 101 being closed, so that now the collar 44 is shifted to the left to neutral and through neutral to engage the balking ring clutch 48 before the balking ring is unlocked or before the speeds cross, and during the yielding lost motion, while the spring 78 is yielding, during this shift, the switch 119 is opened by the plunger 120 to de-energize the throttle solenoid 115 and hence close the throttle, and also the switch 98 is being opened by the plunger 122 to de-energize the solenoid 68 which closes the valve 67 to the flow of air to the clutch operating cylinder 61 and opens said valve to the exhaust of air from this cylinder, so that the clutch 10 is disengaged and held disengaged, as the plunger 122 rides up on the lift 126, and now the direct drive is from the input shaft 1, intermediate shaft 3 and output shaft 2 through the balking ring clutch. As the clutch 10 remains permanently disengaged, the converter 11 is idle and the gearing is idle, due to the overrunning clutches including the rollers 35 and the rollers 42, so that in direct drive, there are no parts rotating idly and no churning of oil in the converter. There is therefore no loss of power in direct drive.

The mechanism for operating the clutch 10 may be provided with an emergency operator-operated lever 211 (Figure 4) connected to the rock arm 64, which operates the clutch throw-out yoke 60 by a link 212, the lever being fulcrumed at 213 to a bracket or bearing on the casing. The lever is formed with a detachable handle 214 which may be mounted thereon, as by a bayonet joint at 215. Thus, in case of failure of air power of the electrical system, the clutch may be operated by means of this emergency lever 211. This lever 211 merely idles during the automatic operation. The lever is held in clutch "on" or "off" position by impositive cam or friction locking means, as a spring-pressed poppet 216.

The mechanical structure of the clutch operating cylinder and piston 61 and 62 is shown in Figure 7, this being carried by a suitable bracket 220 secured to the casing, and the movement of the piston under the air power is against the pressure of two springs 66 and 660 interposed between the piston 62 and one head of the cylinder. Also, a buffer spring 661 is located between the opposite end of the cylinder through which the air enters the cylinder 61 and a thimble 662 having a limited movement under the re-action of the spring 661. An emergency lever 217, similar to the lever 214, is provided for shifting the shift rod of the piston rod 76 manually.

In Figure 7 is also illustrated the structure of any of the solenoids and the combined intake and exhaust valve operated thereby. As this valve is shown in connection with the cylinder and piston motor for operating the main clutch, and as the solenoid 68 and valve 67 are shown, these, it will be understood, are illustrative of the other solenoids and valves shown diagrammatically in Figure 3, as the valves 79, 80 and 116 and their solenoids 81, 82 and 115. The structural features of these solenoids and valves form no part of this invention. The valves are of the combined intake and exhaust type by which the air may exhaust from the cylinder when the valves are closed and the exhaust being closed when the valves are open.

In the general operation, to start from a standing start, the manual switch 107 is opened and the hand lever 86 is shifted into forward position. This shifts the clutch collar 36 to the left into clutching engagement with the outer race 34. The lateral movement of the cam 91, as before described, opens the switch 93 to cause the de-energization of the clutch cylinder 61 to disengage the clutch 10 while the shift is completed to engage the clutch 10. The vehicle then starts in motion, the drive being from the drive shaft 1 through the clutch 10, converter 11, gear 27, countershaft gear 28, countershaft 29, countershaft 30, gear 31 through the overrunning clutch including the rollers 35 to the outer race 34 of this overrunning clutch, clutch collar 36 and clutch gear 37, which is fixed to the output shaft 2. As a higher speed is now desired, the switch 107 is closed, thus closing the circuit through the solenoid 81 through the speed-operated switch 103, which solenoid operates the valve 79 to permit the flow of air to the left end of the shift cylinder 72, thus causing the piston 73 to move to the left and shift the collar 44, first to engage the synchronizer of the clutch 49 and then when synchronization is completed to effect the jaw or toothed engagement between the collar 44 and the outer race 43 of the overrunning clutch, which includes the rollers 42, and during this operation, the throttle solenoid 115 is de-energized by the opening of the switch 119 and again energized when the shift is completed, and also the solenoid 68, which controls the clutch cylinder 61 de-energized momentarily by the opening of the switch 98 by the plunger 122, so that the clutch 10 is disengaged until the shift is completed. As the speed of the vehicle increases, as by the operator operating the usual foot accelerator 201, the speed-operated switch 103 is operated to open the circuit to the solenoid 81 and to close the circuit to the solenoid 82. When the switch arm 105 engages the contact arm 114, the solenoid 82 is energized to open the valve 80 to the flow of air to the right end of the shift cylinder 72, the piston 73 is actuated under the air pressure from central position to the left end of the cylinder 72, thus shifting the piston rod 76 to the left and shifting the clutch collar 44 into engaged position through the balking ring clutch. During this movement of the piston rod 76, the throttle solenoid 115 is de-energized by the opening of the switch 119 by the plunger 120 and again closing it when the shift is completed, and also the switch 98, which controls the main clutch 10 is opened, and remains opened as long as the clutch collar 44 is in direct drive position.

To effect reverse, the hand lever 86 is shifted to select the rod 85 and the lateral movement causes the cam 91 to open the switch 101 through the plunger 100 and also to open the switch 93 momentarily through plunger 92 to disengage the clutch 10 until the reverse shift is completed, that is, until the idler 38 is shifted into mesh with the countershaft gear 33 and the gear teeth on the clutch collar 36.

The cam 91 is thus means operated by the shifting lever, as 86, during its selecting and shifting movements to operate means to open the switch 93 to cause the clutch cylinder 61 to be de-energized, and thus permit the clutch 10 to disengage, and also the means operable by the lateral movement at the ends of the shifting movements to forward and reverse to again energize the clutch cylinder 61 to re-engage the clutch 10 by causing the closing of the switch 93. Also, this cam is broadly means for preventing the shifting into converter and direct drive during selecting movement of the lever 86 by opening the switch 101 in the circuits for the solenoids 81, 82 which operate the air valves 79 and 80 for the cylinder 72, if the hand switch 107 is closed. More particularly, however, the cam in this capacity serves as means for holding the switch 101 open when the shift is being made into reverse, if the hand switch 107 should be closed.

Also, the cam notches 121 constitute means for de-energizing the throttle control member or solenoid 115 by opening the switch 119 in its circuit when a shift is being made from neutral into converter drive or direct drive, and also the cam 98ª constitutes means for opening switch 98 to de-energize the solenoid 68, and hence de-energize the clutch cylinder 61, which holds the main clutch 10 engaged by opening the switch 98, when the piston rod 76 has shifted, as to the right, to shift into converter drive to engage the synchronizer and then momentarily open the switch to release the clutch 10 until the shifting in of the synchronizing clutch 49 is completed, and then again closing the switch 98. The cam lift 126 on the rod 76 also constitutes means for throwing out the main clutch 10 and holding it out when the shift is made from converter drive into direct drive, at which time the piston rod 76 is shifted to the left in Figure 3 and the plunger rides up and remains on the lift 126 after the balking ring clutch is engaged.

What we claim is:

1. In a power transmission mechanism, the combination of input, output and intermediate shafts, the intermediate shaft being coupled to the input shaft to rotate therewith, mechanism for transmitting the power from the input shaft to the output shaft including a main friction clutch and a hydraulic converter mounted concentric with the axes of the shafts, the converter being operated through the friction clutch and including an output turbine, a converter drive clutch and a direct drive clutch having a shifting collar in common operable in one direction from neutral to couple the output turbine to the output shaft through the converter drive clutch and in the other direction to couple the intermediate and output shafts together through the direct drive clutch, clutch shifting means, and means controlled by the shifting means when shifting the clutch collar to connect the intermediate and output shafts directly together for disengaging the main clutch and hold it disengaged.

2. In a power transmission mechanism, the combination of input, output and intermediate shafts, the intermediate shaft being coupled to the input shaft to rotate therewith, mechanism for transmitting the power from the input shaft to the output shaft including a main friction cluch and a hydraulic converter mounted concentric with the axes of the shafts, the converter being operated through the friction clutch and including an output turbine, a converter drive clutch and a direct drive clutch having a shifting collar in common operable in one direction from neutral to couple the output turbine to the output shaft through the converter drive clutch and in the other direction to couple the intermediate and output shafts together through the direct drive clutch, an overrunning clutch between the output turbine and the converter drive clutch, shifting means, and means controlled by the shifting means when shifting the clutch collar to connect the intermediate and output shafts directly together for disengaging the main clutch and holding it disengaged.

3. In a power transmission mechanism, the combination of input, output and intermediate shafts, the intermediate shaft being coupled to the input shaft to rotate therewith, mechanism for transmitting the power from the input shaft to the output shaft including a main friction clutch and a hydraulic converter mounted concentric with the axes of the shafts and including an output turbine, the converter being operated through the friction clutch, a synchronizing converter drive clutch and a direct drive balking ring clutch, the converter and direct drive clutches having a shifting collar in common operable in one direction from neutral to couple the output turbine of the converter to the output shaft through the synchronizing clutch, and in the other direction to couple the intermediate and output shafts together through the direct drive balking ring clutch, and shifting means for operating the main friction clutch and the shifting collar for the converter drive and direct drive clutches.

4. In a power transmission mechanism, the combination of input, output and intermediate shafts, the intermediate shaft being coupled to the input shaft to rotate therewith, mechanism for transmitting the power from the input shaft to the output shaft including a main friction clutch and a hydraulic converter mounted concentric with the axes of the shafts and including an output turbine, the converter being operated through the friction clutch, a synchronizing converter drive clutch and a direct drive balking ring clutch, the converter and direct drive clutches having a shifting collar in common operable in one direction from neutral to couple the output turbine of the converter to the output shaft through the synchronizing clutch, and in the other direction to couple the intermediate and output shafts together through the direct drive balking ring clutch, an overrunning clutch between the output turbine and the converter drive synchronizing clutch, and shifting means for operating the main friction clutch and the shifting collar for the converter drive and direct drive clutches.

5. In a power transmission mechanism, the combination of input, output and intermediate shafts, the intermediate shaft being coupled to the input shaft to rotate therewith, mechanism for transmitting the power from the input shaft to the output shaft including a main friction clutch and a hydraulic converter mounted concentric with the axes of the shafts and including an output turbine, the converter being operated through the friction clutch, a synchronizing converter drive clutch and a direct drive balking ring clutch, the converter and direct drive clutches having a shifting collar in common operable in one direction from neutral to couple the output turbine of the converter to the output shaft through the synchronizing converter clutch, and in the other direction to couple the intermediate and output shafts together through the direct drive balking ring clutch, an overrunning clutch between the output and turbine of the converter and the converter drive synchronizing clutch, shifting means, and means controlled by the shifting means when shifting the balking ring clutch in, for disengaging the main friction clutch and holding it disengaged.

6. In a power transmitting mechanism, the combination of input, output and intermediate shafts arranged in alinement, the intermediate shaft being coupled to the input shaft to rotate therewith, mechanism for transmitting the power through indirect drive from the input shaft to the output shaft including a main friction clutch, a hydraulic torque converter mounted concentric with the axes of the shafts including an output turbine and operated through the friction clutch, an indirect gear train between the output turbine and the output shaft including a gear mounted to permit the output shaft to overrun when driven in a higher gear ratio, a clutch for controlling indirect drive gear train, a converter drive clutch operable to connect the output turbine directly to the output shaft, a direct drive clutch operable to connect the intermediate and output shafts directly together, and means for controlling the shifting of the clutches.

7. In a power transmitting mechanism, the combination of input, output and intermediate shafts arranged in alinement, the intermediate shaft being coupled to the input shaft to rotate therewith, mechanism for transmitting the power from the input shaft to the output shaft including a main friction clutch, a hydraulic torque converter mounted concentric with the axes of the shafts including an output turbine and operated through the friction clutch, an indirect gear train between the output turbine and the output shaft including a gear mounted to permit the output shaft to overrun when driven in a higher gear ratio, a converter drive clutch operable to connect the output turbine directly to the output shaft, an overrunning clutch between the output turbine and the converter drive clutch, a direct drive clutch operable to connect the intermediate and output shafts directly together, and means for controlling the shifting of the clutches.

8. In a power transmission mechanism, the combination with a throttle control member for the engine by which the transmission mechanism is actuated; of input, output and intermediate shafts, the intermediate shaft being coupled to the input shaft to rotate therewith, mechanism for transmitting the power from the input shaft to the output shaft including a main friction clutch, and a hydraulic converter mounted concentric with the axes of the shafts, the converter being operated through the friction clutch and including an output turbine, a converter drive clutch and a direct drive clutch having a shifting collar in common operable in one direction from neutral to couple the output turbine to the output shaft through the converter clutch and in the other direction to couple the intermediate and output shafts together through the direct drive clutch, shifting means for the collar including yielding lost motion connections, and means operated during the taking up of the lost motion for closing the throttle member and again opening it when the shifting in is completed.

9. In a power transmission mechanism, the combination with a throttle control member for the engine by which the transmission mechanism is actuated; of input, output and intermediate shafts, the intermediate shaft being coupled to the input shaft to rotate therewith, mechanism for transmitting the power from the input shaft to the output shaft including a main friction clutch, and a hydraulic converter mounted concentric with the axes of the shafts, the converter being operated through the friction clutch and including an output turbine, a converter drive clutch and a direct drive clutch having a shifting collar in common operable in one direction from neutral to couple the output turbine to the output shaft through the converter clutch and in the other direction to couple the intermediate and output shafts together through the direct drive clutch, shifting means for the clutch collar including yielding lost motion connections, means operated during the taking up of the lost motion for closing the throttle member and again opening it when the shifting in is completed, and means controlled by the shifting in of the clutch collar to connect the intermediate and output shafts directly together, to disengage the main clutch and hold it disengaged.

10. In a power transmission mechanism including input and output shafts, higher ratio change speed gearing between the shafts, and forward and reverse indirect drives, a main friction clutch, clutches shiftable to effect the speed changes, one of which is shiftable to effect forward low indirect drive, the indirect drive also including a shiftable element for effecting reverse drive; the combination of power means for effecting the shifting of the main clutch, power means for effecting the shifting of the clutches controlling the higher speed ratios and shifting means for effecting the shifting of the low speed forward clutch and the reverse shiftable element, including a pair of selectively operable shift rods, and a selecting and shifting lever for operating the rods, the lever having a lateral selecting and a fore-and-aft shifting movement and also having a lateral movement at the ends of its shifting movement, and means operated by the lateral movement of the lever to select either one of the rods to de-energize the main clutch power means to disengage the main clutch and by the lateral movement at the ends of its shifting movement control the flow of power to the main clutch power means to re-engage the same, and means operable by the lateral movement to cut off the flow of power to the power means for the higher ratio clutches.

11. In a power transmission mechanism including input and output shafts and higher ratio change speed gearing between the shafts, forward and reverse indirect drives, a main friction clutch, clutches shiftable to effect the speed changes, one of which is shiftable to effect forward low indirect drive, the indirect drive also including a shiftable element for effecting reverse drive; the combination of a throttle control member for the engine by which the transmission mechanism is actuated, power means for effecting the shifting of the main clutch, power means for effecting the shifting of the clutches controlling the higher speed ratios and shifting means for effecting the shifting of the low speed forward clutch and the reverse shiftable element, including a pair of selectively operable shift rods, and a selecting and shifting lever for operating the rods, the lever having lateral selecting and fore-and-aft shifting movements, and also lateral movements at the ends of its fore-and-aft shifting movement, means operated by the lateral selecting movement of the levers to de-energize the main clutch power means and by the lateral movements at the ends of the shifting in movement to control the flow of power to the main clutch power means, and means operated by the lateral movement of the lever for cutting off the flow of power to the higher ratio power means and for operating the throttle control member to close the throttle upon the selecting and shifting of either of the shift rods and to cut in the flow of power to the higher ratio power means and to operate the throttle control member to open the throttle by the lateral movement at the ends of the fore-and-aft movement.

12. In a power transmission mechanism, the combination of input, output and intermediate shafts arranged in alinement, the intermediate shaft being coupled to the input shaft to rotate therewith, mechanism for transmitting the power from the input shaft to the output shaft independently of the intermediate shaft including a main clutch, and a hydraulic torque converter mounted concentric with the axis of the shaft and including an output turbine and operated through the main clutch, a converter drive clutch operable to connect the output turbine of the converter directly to the output shaft, a direct drive clutch operable to connect the intermediate and output shafts directly together, shifting means for effecting the operation of the last two clutches, and means operated by the shifting of the direct drive clutch into engaged position for disengaging and holding the main clutch disengaged.

13. In a power transmission mechanism, the combination of input, output and intermediate shafts arranged in alinement, the intermediate shaft being coupled to the input shaft to rotate therewith, mechanism for transmitting the power from the input shaft to the output shaft independently of the intermediate shaft including a main clutch, and a hydraulic torque converter mounted concentric with the axes of the shafts including an output turbine and operated through the main clutch, a converter drive clutch operable to connect the output turbine of the converter directly to the output shaft, a direct drive clutch operable to connect the intermediate and output shafts directly together, shifting means for effecting the operation of the last two clutches including an element common to both clutches and shiftable in one direction to engage one clutch and disengage the other, and in the opposite direction to engage the latter clutch and disengage the former, means for shifting said element, and means controlled thereby for disengaging the main clutch and holding it disengaged, when the direct drive clutch is shifted into engaged position.

14. In a power transmission mechanism, the combination of input, output and intermediate shafts arranged in alinement, the intermediate shaft being coupled to the input shaft to rotate therewith, mechanism for transmitting the power from the input shaft to the output shaft including a main friction clutch, a hydraulic torque converter mounted concentric with the axes of the shafts and including an output turbine, the converter being operated through the friction clutch, a low gear train between the output turbine and the output shaft including a gear mounted to permit the output shaft to overrun when driven in a higher gear ratio, a converter drive clutch operable to connect the output turbine directly to the output shaft, a direct drive clutch operable to connect the intermediate and output shafts directly together, a low gear clutch operable to connect the low gear train in operative relation with the output shaft, shifting means for the low gear train clutch, and power shifting means for the converter drive and direct drive clutches, and output speed controlled means for controlling the operation of the shifting means for the converter and direct drive clutches.

15. In a power transmission mechanism, the combination of input, output and intermediate shafts arranged in alinement, the intermediate shaft being coupled to the input shaft to rotate therewith, mechanism for transmitting the power from the input shaft to the output shaft including a main friction clutch, a hydraulic torque converter mounted concentric with the axes of the shafts and including an output turbine, the converter being operated through the friction clutch, a low gear train between the output turbine and the output shaft including a gear mounted to permit the output shaft to overrun when driven in a higher gear ratio, a converter drive clutch operable to connect the output turbine directly to the output shaft, a direct drive clutch operable to connect the intermediate and output shafts directly together, and a low gear clutch operable to connect the low gear train in operative driving relation with the output shaft, shifting means for the low gear train clutch, power shifting means for the converter drive and direct drive clutches, output speed controlled means for controlling the operation of the shifting means for the converter and direct drive clutches, and means operated by the shifting means for the low gear train clutch to disable the shifting means for the converter and direct drive clutches, except when the shifting means for the low gear train clutch is in a predetermined position.

16. In a power transmission mechanism, the combination of input, output and intermediate shafts arranged in alinement, the intermediate shaft being coupled to the input shaft to rotate therewith, mechanism for transmitting the power from the input shaft to the output shaft including a main friction clutch, a hydraulic torque converter mounted concentric with the axes of the shafts and including an output turbine, the converter being operated through the friction clutch, a low gear train between the output turbine and the output shaft, including a gear mounted to permit the output shaft to overrun when driven in a higher gear ratio, a converter drive clutch operable to connect the output turbine directly to the output shaft, a direct drive clutch operable to connect the intermediate and output shafts directly together, a low gear clutch operable to connect the low gear train in operative driving relation with the output shaft, shifting means for the low gear trains clutch, power shifting means for the main clutch, shifting means for the converter drive and direct drive clutches, and output-speed controlled means for controlling the operation of the converter and direct drive clutch shifting means, and means controlled by the operation of the shifting means for the converter and direct drive clutches for operating the main clutch shifting means to disengage the main clutch preliminarily to and during shifting operations of said clutches.

17. In a power transmission mechanism, the combination of input, output and intermediate shafts arranged in alinement, the intermediate shaft being coupled to the input shaft to rotate therewith, mechanism for transmitting the power from the input shaft to the output shaft including a main friction clutch, a hydraulic torque converter mounted concentric with the axes of the shafts and including an output turbine, the converter being operated through the friction clutch, a low gear train between the output turbine and the output shaft, including a gear mounted to permit the output shaft to overrun when driven in a higher gear ratio, a converter drive clutch operable to connect the output turbine directly to the output shaft, a direct drive clutch operable to connect the intermediate and output shafts directly together, and a low gear train clutch operable to connect the low gear train in operative driving relation with the output shaft, shifting means for the low gear train clutch, power shifting means for the main clutch, power shifting means for the converter drive and direct drive clutches, output speed controlled means for controlling the operation of the power means for the converter and direct drive clutch shifting means, means operated by the low gear train clutch shifting means to disable the shifting means for the converter and direct drive clutches, except when the low gear train clutch shifting means is in a predetermined position, and means controlled by the operation of the converter and direct drive clutch shifting means for operating the main clutch shifting means to disengage the same preliminarily to and during shifting operations of said converter and direct drive clutches.

18. In a power transmission mechanism, the combination of input, output and intermediate shafts arranged in alinement, the intermediate shaft being coupled to the input shaft to rotate therewith, mechanism for transmitting the power from the input shaft to the output shaft including a main friction clutch, a hydraulic torque converter mounted concentric with the axes of the shafts and including an output turbine, the converter being operated through the friction clutch, a low gear train between the output turbine and the output shaft including a gear mounted to permit the output shaft to overrun when driven in a higher gear ratio, a clutch and shifting means therefor for controlling the low gear train, a converter drive clutch operable to connect the output turbine directly to the input shaft, a direct drive clutch operable to connect the intermediate and output shafts directly together, power shifting means operable to alternately engage the converter and direct drive clutches, power means to engage the main clutch, means controlled by the shifting in of the low gear clutch and by the shifting in of the converter drive and direct drive clutches to control the operation of the shifting means for the main clutch to disengage the main clutch during gear shifting operations.

19. The combination set forth in claim 18 in which the power shifting means for the converter and direct drive clutches is a fluid operated motor, the piston of which is movable in opposite directions from central position, and means for returning it to central position, and the power means for the main clutch is a fluid operated motor movable in one direction to engage the clutch by power, and means for moving the piston in the opposite direction, and the control for the motive fluid includes valves and electro-responsive devices for operating the valves, electric circuits for said devices having switches therein, one of said switches opened by the shifting of the low gear ratio clutch and closed when the shifting is completed, and another switch being opened by the initial shifting of the piston of the motor for the converter and direct drive clutches, and an output speed operated switch in the circuits for the electro-responsive devices controlling the valves for the motor for the converter and direct drive clutches.

20. In a power transmission mechanism, the combination of input, output and intermediate shafts arranged in alinement, the intermediate shaft being coupled to the input shaft to rotate therewith, mechanism for transmitting the power from the input shaft to the output shaft independently of the intermediate shaft including a main clutch, and a hydraulic torque converter mounted concentric with the axis of the shaft and including an output turbine and operated through the main clutch, a converter drive clutch operable to connect the output turbine of the converter directly to the output shaft, a direct drive clutch operable to connect the intermediate and output shafts directly together, shifting means for effecting the operation of the last two clutches, output speed operated means for effecting the operation of the shifting means, means operated by the shifting of the direct drive clutch into engaged position for disengaging and holding the main clutch disengaged, and driver operated means operable at will to disengage the converter drive clutch, when the shift into direct drive is completed.

CARL D. PETERSON.
ALBERT H. DEIMEL.